United States Patent [19]
Wubbe

[11] 3,855,664
[45] Dec. 24, 1974

[54] WIPER BLADE REFILL ELEMENT

[75] Inventor: Leo J. Wubbe, Beverly Shores, Ind.

[73] Assignee: The Anderson Company, Gary, Ind.

[22] Filed: Feb. 1, 1973

[21] Appl. No.: 328,647

[52] U.S. Cl. .......................................... 15/250.42
[51] Int. Cl. ............................ B60s 1/04, B60s 1/38
[58] Field of Search ..................... 15/250.36, 250.42

[56] References Cited
UNITED STATES PATENTS

| | | | |
|---|---|---|---|
| 2,925,615 | 2/1960 | Krohm | 15/250.42 |
| 2,966,692 | 1/1961 | Zaiger | 15/250.36 |
| 3,208,091 | 9/1965 | Golub et al. | 15/250.36 |
| 3,386,123 | 6/1968 | Oishei et al. | 15/250.36 X |

FOREIGN PATENTS OR APPLICATIONS

| | | | |
|---|---|---|---|
| 692,226 | 7/1965 | Italy | 15/250.36 |
| 1,088,410 | 10/1967 | Great Britain | 15/250.42 |

*Primary Examiner*—Peter Feldman
*Attorney, Agent, or Firm*—Wegner, Stellman, McCord, Wiles & Wood

[57] ABSTRACT

A windshield wiper assembly for a curved windshield including a pressure distributing superstructure having claws adapted to engage a blade structure at longitudinally spaced positions. The blade structure including a flexible holder having a pair of outwardly projecting edge portions for slidable engagement with the claws of the superstructure, and a resilient wiping member having a retention bead with an opening for use in threading the flexible holder and wiping member together.

4 Claims, 6 Drawing Figures

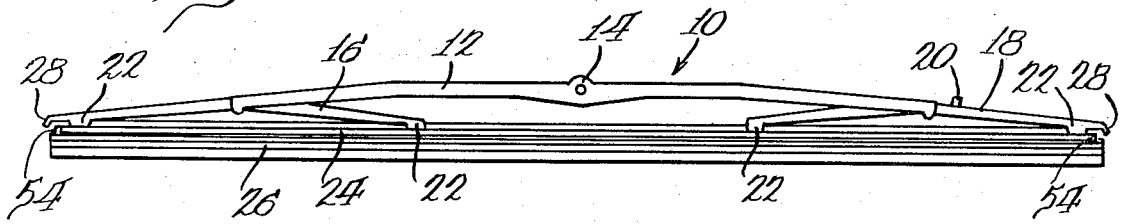
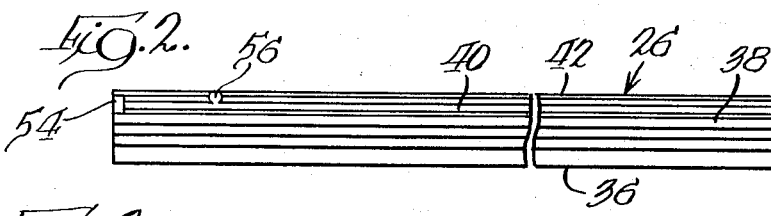
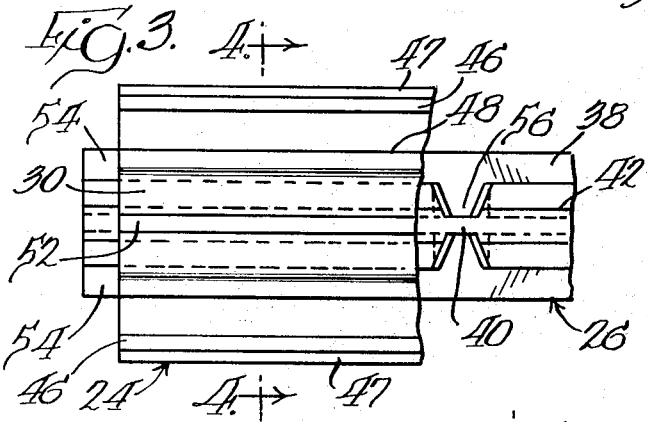
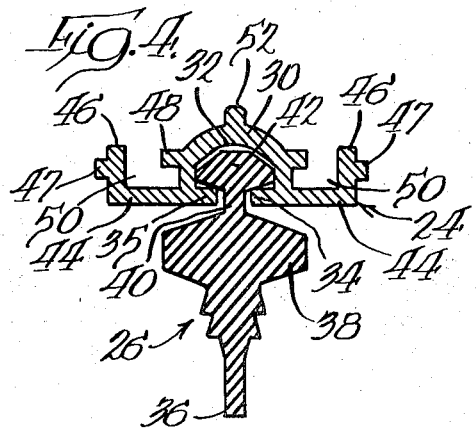
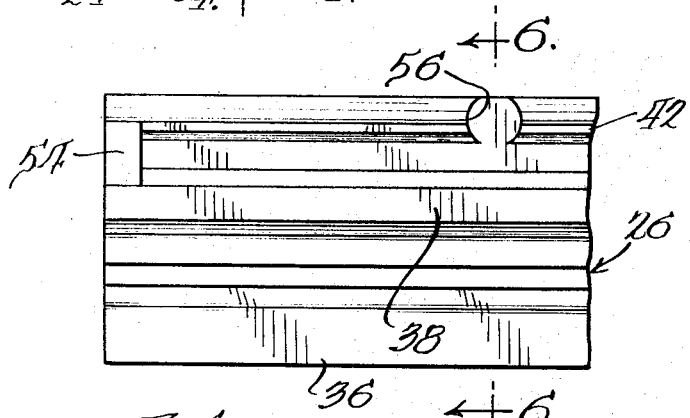
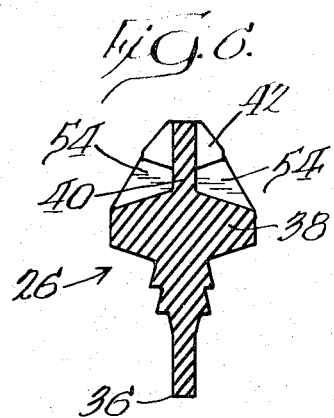

WIPER BLADE REFILL ELEMENT

BACKGROUND OF THE INVENTION

The present invention relates to a windshield wiper blade structure including a flexible backing member or holder, sometimes called a flexor, and a resilient wiping member slidably mounted on the backing member in a manner permitting removal of the wiping member for replacement.

In the past, wiper blade structures have included resilient wiping members and flexible backing or reinforcing members embedded therein. However, the wiping member and the reinforcement member have not always been readily separable to permit removal and replacement of the wiping member alone in the event it becomes worn.

It would be desirable to provide a wiper blade structure in which the wiping member and the reinforcement member or backing member are readily separable from each other when desired while still prevented from unintentional separation during use.

SUMMARY OF THE PRESENT INVENTION

It is a general object of the present invention to provide a new and improved resilient windshield wiping element having a lower wiping edge, a reduced intermediate neck portion, and a relatively thick retention bead along the upper edge positionable in a retention chamber of a backing member, together with abutment means at each end of the wiping element projecting outwardly relative to the reduced neck portion for engaging the ends of the backing member to hold the wiping element assembled with the backing member. The wiping element has a recess in the retention bead near one end of the wiping element to enable threading of the retention bead into the retention chamber in the backing member.

Another object is to provide a new and improved windshield wiping element including a lower wiping edge, a reduced intermediate neck portion, and a relatively thick retention bead along the upper edge of the neck portion to define a pair of grooves or slots in the sides of the wiping element into which grooves or slots inwardly facing spaced apart edges of a one piece backing member nest and said retention bead having an opening communicating with said grooves or slots enable threading and unthreading of said wiping element from said backing element.

Another object is to provide a wiper blade structure including a resilient wiping element of the type described above in association with an elongate flexible backing member having a longitudinal retention chamber for a wiping element, inwardly projecting edges defining a slot opening into the retention chamber along the bottom of the backing member, and laterally outwardly projecting edges on the outside of the backing member for receiving the claws of a superstructure.

BRIEF DESCRIPTION OF THE DRAWINGS

FIG. 1 is a side elevational view of a windshield wiper apparatus embodying the principles of the present invention;

FIG. 2 is an enlarged fragmentary side elevational view of our improved blade structure, removed from the superstructure illustrated in FIG. 1;

FIG. 3 is an enlarged fragmentary top plan view of the blade structure illustrated in FIG. 2;

FIG. 4 is an enlarged transverse sectional view of the blade structure illustrated in FIG. 2, taken at about the line 4—4;

FIG. 5 is an enlarged fragmentary side elevational view of the wiping element, removed from the backing element; and, FIG. 6 is a cross section through the wiping element taken at about the line 6—6 of FIG. 5.

DETAILED DESCRIPTION OF PREFERRED EMBODIMENT

Referring now to the drawings in more detail, a superstructure 10 includes a primary yoke member or bridge member 12 having a central portion constructed as at 14 for appropriate attachment to a spring-pressed wiper arm and which superstructure forms no part of the present invention. Opposite ends of the primary yoke member 12 are attached to mid portions of secondary yokes 16 and 18. The superstructure, including the primary yoke 12 and the secondary yokes 16 and 18, may correspond in general with the construction illustrated in prior U.S. Pat. No. 2,897,530 to John W. Anderson. Preferably at least one of the secondary yokes, 18 as shown herein, is releasably attached to the primary yoke 12, and may be readily detached upon depression of a release button illustrated at 20, in the manner described in the last mentioned patent. Opposite ends of the secondary yokes 16 and 18 are formed with claws as at 22 engaging a backing member 24 carrying a wiping member 26. Outboard ends of the secondary yokes 16 and 18 include downwardly turned end portions 28 for limiting longitudinal movement of the backing member 24 relative to the superstructure, thereby to retain the blade structure on the superstructure.

A wiper of the type illustrated is adapted for cleaning curved and flat windshields on automotive vehicles. The superstructure, including pressure-distributing yokes 12, 16 and 18, transmits pressure from a spring-pressed wiper arm to the flexible backing member 24 and wiping member 26. As a result of the pressure distributed through the yokes, the backing member is urged toward the curved windshield, and as the wiper assembly is moved back and forth over the windshield, the wiping member conforms to the constantly changing curvature of the windshield.

The backing member 24 is preferably of extruded or molded flexible plastic material such as nylon, and includes a central tubular portion 30 having a chamber 32 which functions as a receiver for a retaining bead on the wiping element 26. Preferably, the chamber 32 is somewhat triangular in cross-sectional configuration and a relatively narrow slot 34 opens into the chamber along the bottom of the tubular portion 30 between edges or retention lips 35. The wiping element 26 is preferably made of relatively soft resilient rubber-like material and includes a relatively thin wiping edge 36, a thicker intermediate portion 38, a relatively thin neck portion 40 and an enlarged retention bead 42 along the upper edge. The space between the intermediate portion and the retention portion provides laterally opening grooves which receive the edges or retention lips 35 of the backing member. In use of the invention, the wiping element 26 is attached to the backing member 24 with the retention bead 42 of the wiping element disposed in the receiver chamber 32, and with the relatively thin neck portion 40 of the wiping element disposed in the receiver slot 34. As illustrated, the retention bead 42 has a generally triangular cross section which is complementary to the receiver chamber 32. The wiping element 26 is attached to the backing member 24 by threading the bead 42 into the receiver chamber 32 as will be described in detail hereinafter. It is to be understood that the present concept of threading a retention bead 42 into a backing member can be used with any backing member having a blind slot or opening in the central portion thereof into which the reduced neck portion of the wiping element is nested.

As best understood by reference to FIGS. 3 and 4, the backing member 24 is relatively wide and relatively thin, and includes a pair of opposed rails or flanges 44 extending laterally outwardly in opposite directions from the slot 34 at the bottom of the receiver 30. As illustrated, the backing member 24 has each of the flanges 44 formed along the outside edge with an upwardly directed flange 46 which functions to reinforce or strengthen the flange 44 along the outer edge so as to limit its flexibility in one plane. Each of the flanges 46 includes an outwardly directed reinforcing rib 47 which limits the capacity of the upright flange to bow outwardly. Above the flanges 44, the receiver 30 is formed with outwardly directed flanges 48 which are spaced from the flanges 44 and has outer edges spaced from the flanges 46 in a manner to form slots 50 for receiving the claws 22 of the secondary yokes 16 and 18. The top of the tubular receiver 30 is formed with a longitudinal reinforcing rib 52 which limits the capacity of the tubular portion to collapse against the retention rib 42 of the flexible wiping member. By virtue of the construction described, the backing member is relatively inflexible in a plane parallel to flanges 44 and 48 and relatively flexible in a direction perpendicular thereto to conform to the curvature of the windshield.

In assembly of the apparatus as illustrated in FIG. 1, the backing member 24 with the assembled wiping member 26 is attachable to the secondary yokes 16 and 18 by insertion of the yoke claws 22 into the claw slots 50 at the end of the backing member. The claws fit loosely enough in the slots 50 so that the backing member is slidable relative to the claws to longitudinally position the backing member properly relative to the superstructure. When the backing member and the wiping member are positioned as illustrated in FIG. 1, the downwardly directed end portions 28 on the yokes 16 and 18 limit longitudinal movement of the backing member relative to the secondary yokes and prevent accidental removal of the backing member from the superstructure. Assembly of the apparatus is facilitated by disconnecting the secondary yoke 18 from the primary yoke 12, so that the secondary yoke 16 may be assembled on the backing member from the left end as viewed in FIG. 1, and the secondary yoke 18 may be assembled on the backing member from the right end as viewed in FIG. 1, after which the secondary yoke 18 is again attached to the end of the primary yoke 12.

The wiping member 26 is assembled relative to the backing member 24 by sliding the retention bead 42 into the end of the receiver chamber 32, while the relatively thin neck portion 40 of the wiping member is inserted into the slot 34 in the bottom of the receiver. Means is provided for releasably retaining the wiping member against substantial longitudinal movement relative to the backing member so that the parts do not become disassembled unintentionally. As illustrated herein, the wiping element 26 is formed at oppsite ends with an abutment or stop portion 54 extending outwardly at each side of the reduced neck portion 40 between the intermediate body portion 38 and the enlarged bead 42 and adapted to engage the ends of the receiver edges or lips 35. By virtue of the abutments 54 at each end of the wiping member, the wiping member is retained against significant unintentional longitudinal displacement relative to the backing member.

In order to facilitate insertion of the wiping member into the backing member despite the abutments 54 at opposite ends, the retention bead 42 is omitted for a short length adjacent one or both ends to form a gap as illustrated at 56. In assembly, the end portion of the wiping element adjacent the stop 54 illustrated in FIG. 3 is bent downwardly to expose the end of the retention bead 42 at the right edge of the gap 56, so that the bead may be inserted in the right end of the receiver chamber 32 and moved toward the left to the position illustrated in FIG. 3. At this time, the left end portion of the wiper member 26 may be resiliently stretched to insert the remaining end portion of the bead 42, at the left of gap 56, into the left end of the receiver chamber 32. Now, when the stretched wiping element is released, it retracts to the position shown in FIG. 3. The wiping element may be removed from the backing member by reversing the procedure.

The wiper blade assembly 10 employing a worn or deteriorated wiping element either with the illustrated plastic flexor 24 or with a one piece metal or plastic planar shaped slotted flexor may be restored to a useful and effective wiper by the expedient of removing the worn wiping element with or without disassembling the wiping element and flexor from the superstructure. Once the worn wiping element is removed a new improved wiping element 26 with an assembling gap 56 is assembled with the flexor 24 by threading the flexor through the gap 56 as described above. No special flexors are required so that the wiping element with the gap 56 is refillable with large variety of blades heretofore only refillable with special flexors and/or accessories.

I claim:
1. A windshield wiper element comprising an elongate body of soft resilient material having
   a. a wiper edge,
   b. a relatively thick intermediate portion,
   c. a relatively thin neck portion above the intermediate portion,
   d. a relatively thick continuous retention bead along the upper edge to define a groove in each side wall with the base of the groove being the thin neck portion,
   e. a single recess in the retention bead near at least one end of the body enabling threading of the wiping element into assembled relationship with a backing member, and
   f. abutment means provided in the ends of the grooves for preventing the backing member from sliding axially out of said slot.

2. A windshield wiper blade comprising a wiping element and a backing member, said wiping element having an elongate strip of rubber-like material having
   a. a relatively thin wiping edge,
   b. a relatively thick intermediate body portion, c. a relatively thin neck portion above the intermediate portion,
d. a relatively thick continuous retention bead along the upper edge,
e. said relatively thick intermediate body portion and retention bead forming laterally opening grooves, and
f. a gap formed in said retention bead communicating with said grooves, said backing member having a pair of uninterrupted spaced apart planar portions having edges facing inwardly for seating in said grooves of said wiping element, and said backing member being inserted into and removed from said wiping element by threading said thin neck portion between said spaced apart planar portions through said gap.

3. A windshield wiper element as defined in claim 2, including a stop at each end of each of said grooves extending laterally from the reduced neck portion into the adjacent groove and including a retention portion on said backing member for holding the pair of planar portions in spaced apart relationship and into which portion said retention bead nests when the wiping element is assembled with said backing member.

4. A windshield wiper blade structure adapted for use with a curved windshield, comprising,
   a. an elongate flexible backing member having a longitudinal retention chamber, retention edges defining an uninterrupted slot opening into the retention chamber along the bottom of the backing member and continuous laterally outwardly opening grooves on the outside of the backing member for receiving claws of a superstructure;
   b. a resilient wiping element having a lower wiping edge, a reduced neck portion positionable in the slot in the backing member between the retention edges and a relatively thick continuous retention bead along the upper edge positionable in the retention chamber,
   c. abutment means at each end of the wiping member projecting outwardly from the reduced neck portion to engage opposite ends of the backing member to limit longitudinal movement of the wiping element relative to the backing member, and
   d. a recess in the retention bead near at least one end of the wiping element for threading the retention bead into the retention chamber of the backing member.

* * * * *